United States Patent [19]

Imaizumi et al.

[11] Patent Number: 5,200,830
[45] Date of Patent: Apr. 6, 1993

[54] FACSIMILE APPARATUS CAPABLE OF RECEIVING AND PRINTING MULTIPLE KINDS OF DATA IN ACCORDANCE WITH A PREDETERMINED PRIORITY ORDER

[75] Inventors: Mamoru Imaizumi, Nagoya; Toshinori Taniguchi, Inabe, both of Japan

[73] Assignee: Brother Kogyo Kabushiki Kaisha, Japan

[21] Appl. No.: 630,256

[22] Filed: Dec. 19, 1990

[30] Foreign Application Priority Data

Jan. 25, 1990 [JP] Japan .................................. 2-15408

[51] Int. Cl.⁵ .......................... H04N 1/23; H04N 1/32
[52] U.S. Cl. .................................... 358/296; 358/437; 358/442; 358/468
[58] Field of Search ............... 358/296, 401, 434, 436, 358/437, 438, 442, 443, 462, 464, 467, 468; 346/76 PH; 355/314

[56] References Cited

U.S. PATENT DOCUMENTS 4,623,244 11/1986 Andrews .............................. 355/314
4,922,546 5/1990 Takahashi ............................ 358/434

FOREIGN PATENT DOCUMENTS 6156660 12/1986 Japan .

Primary Examiner—Benjamin R. Fuller
Assistant Examiner—Scott A. Rogers
Attorney, Agent, or Firm—Oliff & Berridge

[57] ABSTRACT

A facsimile apparatus has a first operating mode in which first data entered through an interface from an external unit is received in precedence over second data entered through a modem from other facsimile apparatus over a communication line, and a second operating mode in which the second data is received in precedence over the first data, and is operative to receive and print data in accordance with the mode of priority order set on a switch. The apparatus is provided with two sheet delivery ports so that print paper (print sheet) on which the first data is printed and print paper (reception sheet) on which the second data is printed are delivered separately to the respective delivery ports. The apparatus allows the user to obtain a printed sheet of urgent data immediately, and also frees the user from hand separation of print sheets and reception sheets.

26 Claims, 5 Drawing Sheets

| | |
|---|---|
| ESC+"@" (40H) | OUTPUT MODE COMMAND |
| ESC+"I" (49H) | IMAGE INPUT MODE COMMAND (FINE MODE) |
| ESC+"R" (52H) | IMAGE INPUT MODE COMMAND (NORMAL MODE) |
| ESC+":" (3AH) | COMMUNICATION MODE COMMAND (FINE MODE) |
| ESC+";" (3BH) | COMMUNICATION MODE COMMAND (NORMAL MODE) |
| ESC+"NUL" (00H) | OUTPUT MODE TERMINATION COMMAND |

Fig.3

| | | DATA LENGTH (IN BYTES) | |
|---|---|---|---|
| FS | DATA LENGTH | CODED IMAGE DATA | 0FILL |
| FS | DATA LENGTH | CODED IMAGE DATA | 0FILL |
| FS | DATA LENGTH | CODED IMAGE DATA | 0FILL |
| FS | NUL,NUL | | |

FACSIMILE APPARATUS CAPABLE OF RECEIVING AND PRINTING MULTIPLE KINDS OF DATA IN ACCORDANCE WITH A PREDETERMINED PRIORITY ORDER

BACKGROUND OF THE INVENTION

1. Field of the Invention

The present invention relates to a facsimile apparatus, and more particularly to a facsimile apparatus which functions as a printing unit for printing information sent from an external apparatus that processes coded data and also functions as a communication unit for receiving image information sent from other facsimile apparatus over a communication line, so that multiple kinds of data are received and printed in accordance with a predetermined priority order.

2. Description of the Related Art

Conventional facsimile apparatus have processors for transmitting and receiving images over communication lines. More recently, a facsimile apparatus is provided with a second interface means so that it can be used as a general-purpose output unit for a host computer that includes a wordprocessor, personal computer, etc., as disclosed in Japanese Patent Publication No. 61-56660.

On the other hand, there are proposed personal computer facsimile apparatus and the like in which a host computer is added by a facsimile modem, image reader and printer so that it can communicate with other facsimile apparatus through a communication line.

However, the conventional facsimile apparatus do not have a function and mechanism for distinguishing a sheet of paper which records image information sent from other facsimile apparatus (will be termed simply "reception sheet" hereinafter) and a sheet of paper which records the output of the host computer through the interface (will be termed "print sheet" hereinafter). Therefore, two kinds of sheets are delivered without separation, and the user has to separate reception sheets and print sheets by hand.

Moreover, the conventional facsimile apparatus has only one printer, which prints both reception sheets and print sheets. The apparatus does not have a function of setting the priority order for a reception sheet or print sheet, and therefore incoming print data through the interface is kept waiting during the printing of a reception sheet, or incoming data over the communication line is kept waiting during the printing of a print sheet. It is not possible for the user to get a print of a desired one on a priority basis.

The ability of printing data from two different sources even adversely compels the user to have additional labor to separate the sheets, while disallowing the user to print one type of data in precedence over the other.

SUMMARY OF THE INVENTION

Accordingly, it is an object of the present invention to overcome the foregoing prior art deficiency and to provide a facsimile apparatus having two sheet delivery ports and a sheet delivery controller which operates on the delivery ports selectively to deliver a reception sheet and print sheet separately so that the user can get the intended sheet without encountering any difficulties.

Another object of the present invention is to provide a facsimile apparatus having a priority discrimination function for data input from a communication line and data input from the interface so that when the apparatus receives data with higher priority, which is set by the user, during the reception and printing of data with lower priority, the high-priority data is received and printed promptly by suspending the operation of the low-priority data.

In order to achieve the above objectives, the present invention relates to a facsimile apparatus having data reception means for receiving first data which is sent from an external unit and second data which is sent from other facsimile apparatus, and printing means for printing the first data and second data received by the data reception means on separate sheets of paper, wherein the apparatus further comprises mode setting means for setting a first mode in which the first data is received through the data reception means in precedence over the second data, and a second mode in which the second data is received through the data reception means in precedence over the first data, mode discrimination means for determining the mode which is set by the mode setting means, reception control means for controlling the data reception means based on the result of discrimination made by the mode the determination means, and print control means for controlling the printing means to print the first data and second data received by the data reception means under control of the reception control means.

The present invention is also characterized in the provision of two sheet delivery means for delivering separately sheets of paper on which the first data and second data are printed, and a sheet delivery control means for controlling the sheet delivery means to deliver the two kinds of printed paper separately.

The inventive facsimile apparatus operates to print data, which is sent from an external unit and received by the data reception means, and deliver the printed sheet to the first sheet delivery port under control of the sheet delivery controller, and operates to print data, which is sent from other facsimile apparatus over a communication line and received by the data reception means, and deliver the printed sheet to the second sheet delivery port under control of the sheet delivery controller.

In the case of competing reception/print requests for the two kinds of data, these data are received and printed in accordance with the priority order which has been set by the user in advance.

Consequently, printed sheets of data which have been received from the data reception means and from other facsimile apparatus over a communication line are delivered to separate sheet delivery ports, whereby the user is freed from the awkward task of separating print outputs. The user is allowed to determine the priority order of data sources, i.e., data input from a communication line and data input from the interface, through the priority order setting means and priority order discrimination means, whereby the user can promptly get a printed sheet of higher urgency or a printed sheet of the intended data source.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

The invention will be described in detail with reference to the following drawings, wherein.

DETAILED DESCRIPTION OF THE PREFERRED EMBODIMENTS

A facsimile apparatus based on a preferred embodiment of the present invention will be described in detail with reference to the accompanying drawings.

Figure 1:
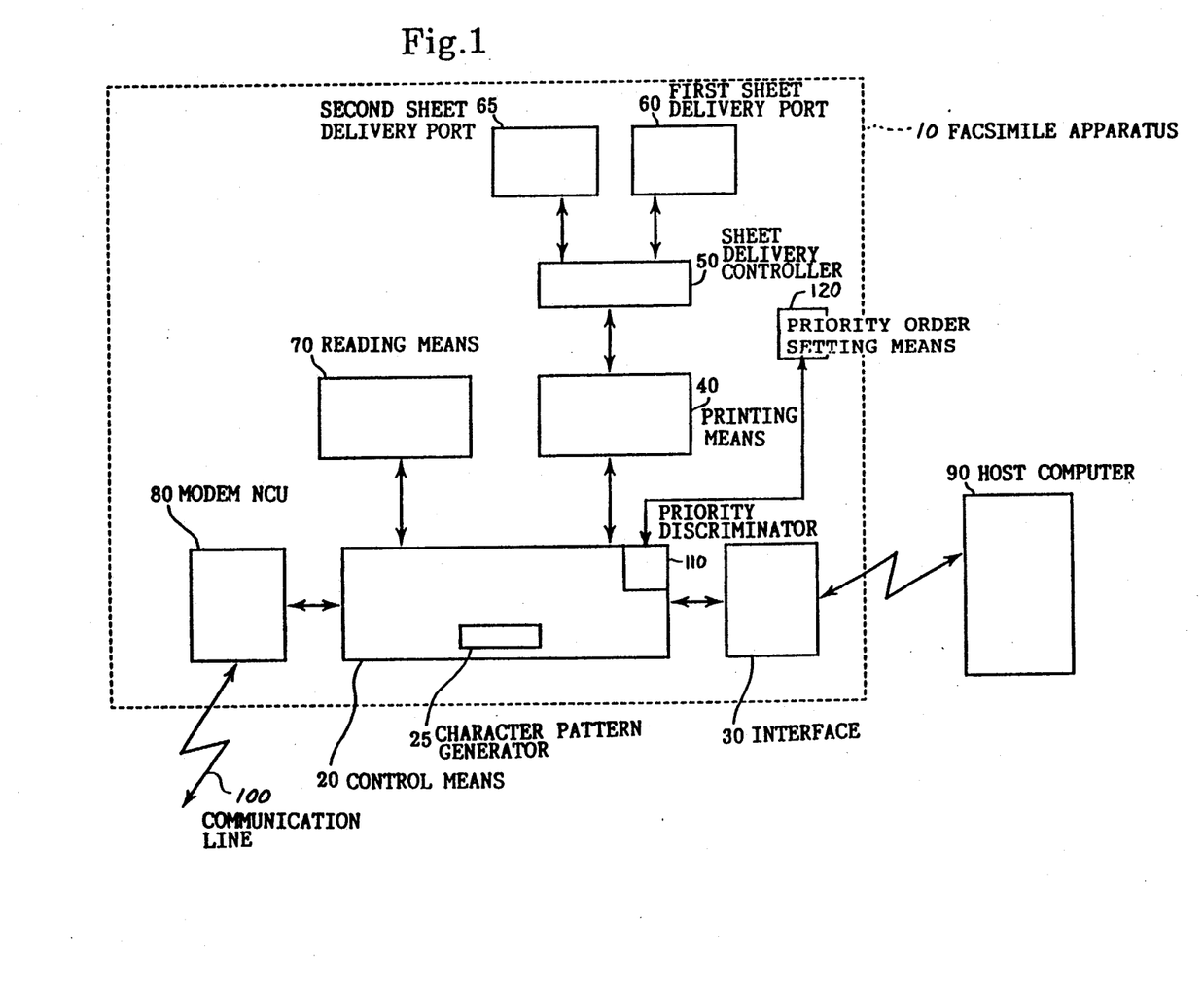
FIG. 1 is a block diagram of the facsimile apparatus based on the present invention.

FIG. 1 is a block diagram of the embodiment of the invention. The facsimile apparatus 10 incorporates well-known general functional blocks including a reading means 70, a printing means 40, a modem Network Control Unit (NCU) 80, a control means 20 (or controller), a sheet delivery controller 50, and an interface means 30 for connection with a host computer 90. And further, the facsimile apparatus 10 is provided with two sheet delivery ports: a first sheet delivery port 60 and a second sheet delivery port 65, which are one feature of this invention. The control means 20 includes a character pattern generator 25 and a priority discriminator 110 which is connected with a priority order setting means 120. The modem NCU 80 is connected with a communication line 100 so that it communicates with other facsimile apparatus.

The interface means 30 of this embodiment is a generally used serial RS-232C interface established to operate at 200 bits per seconds (BPS) for bi-directional data transfer. The details of this well-known communication system will not be explained here.

The printing means 40 has a thermal head formed of 1728 pieces of print dots aligning at a resolution of 8 dots/mm, and it is capable of printing a whole line at once along the shorter side of an A4-sized print paper. Print data is supplied by the controller 20. The printing means 40 incorporates a sheet feed means (not shown), which transports the print paper at 7.7 dots/mm in terms of resolution. Consequently, the printing means 40 is capable of printing the whole page at a resolution of 8 dots/mm along the shorter side of an A4-sized print paper and at a resolution of 7.7 dots/mm along the longer side thereof. The reading means 70 is constituted of a well-known lens, a Charge Coupled Device (CCD) and the like, and it is capable of reading the data on the A-4 sized print paper per bit at the same resolution as that of the printing means 40.

The modem NCU 80, which functions as a communication controller, adopts the V32 standard recommended by the Comité Consultatif Internationale Télégraphique et Teléphonique (CCITT) so that it can transmit and receive data to/from other general facsimile apparatus over the communication line 100. Connection with and disconnection from other facsimile apparatus are controlled by the controller 20 in accordance with the facsimile line connection protocol.

The priority order setting means 120 is formed of various switches of the known type, and the priority discriminator 110 determines the priority of data entries from the communication line 100 and from the interface 30 based on the setting of the switches.

Figure 2:
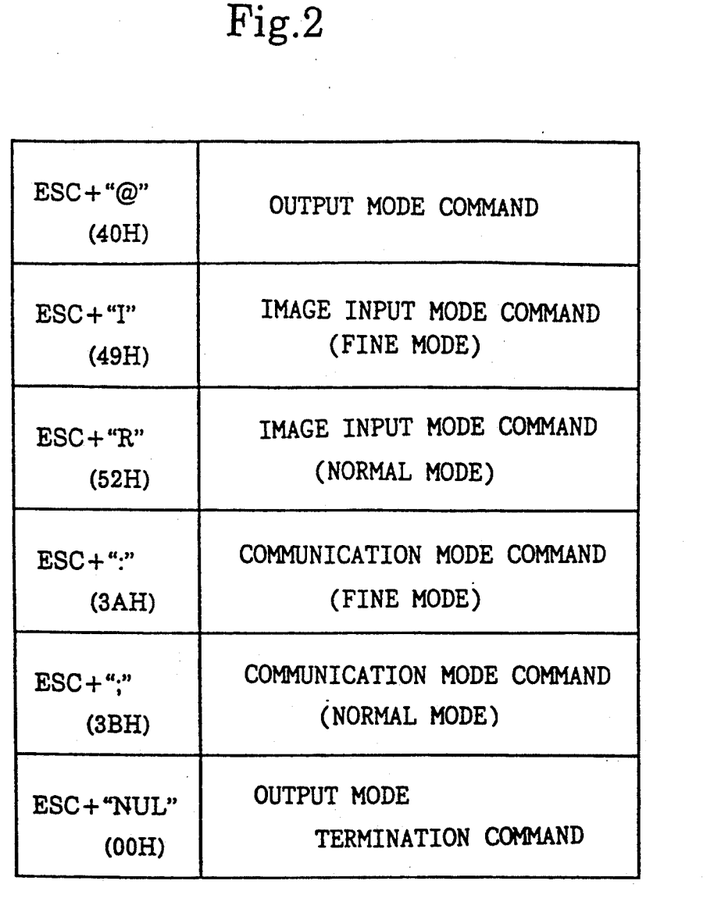
FIG. 2 is a diagram showing the mode switching command.

The sheet delivery controller 50 responds to the command from the controller 20 to direct a printed sheet to the first sheet delivery port 60 or second sheet delivery port 65 in accordance with the output mode which is set at the entry of the ESC+@ command shown in FIG. 2 sent from the host computer 90 through the interface means 30.

In this output mode, each piece of coded character data operates on the character pattern generator 25 as an image information forming means in the controller 20 to generate each character pattern, and after character data for one line have been entered to the controller 20, the printing means 40 prints the received data.

In response to the entry of the command ESC+NUL, the printing means 40 cuts the print paper, and the output mode is terminated.

The image input mode is set at the time when the image input mode command from the host computer 90 is entered to the controller 20 by way of the interface means 30. Namely, in response to the command ESC+"I" (fine mode with longitudinal resolution of 7.7 dots/mm) or ESC+"R" (normal mode with resolution of 3.85 dots/mm), shown in FIG. 2, the image on the printed paper which is set in the reading means 70 is converted by the controller 20 into the image data format shown in FIG. 3, and the coded image data is sent to the host computer 90 by way of the interface means 30.

Figure 3:
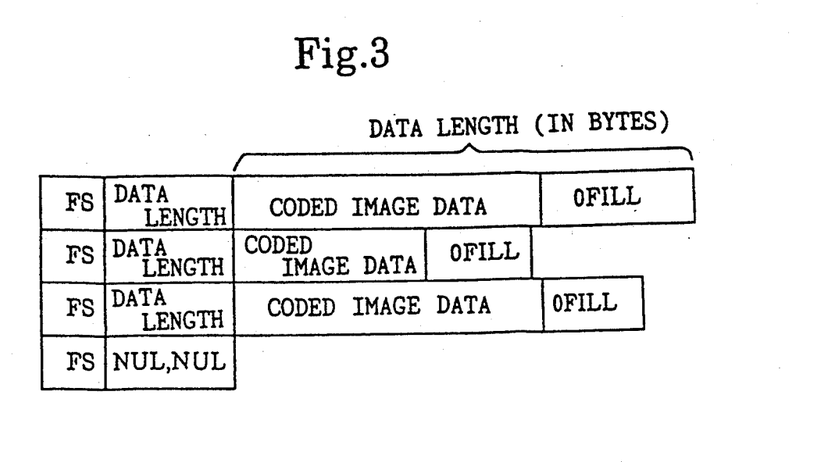
FIG. 3 is a diagram showing the transmission and reception formats of the image data.

The output of FS (code indicating the head of image)+NUL+NUL indicates the end of reading for one page. Another output of FS+NUL+NUL indicates the absence of text to be read by the reading means 70, and the image input mode is terminated.

Figure 4:
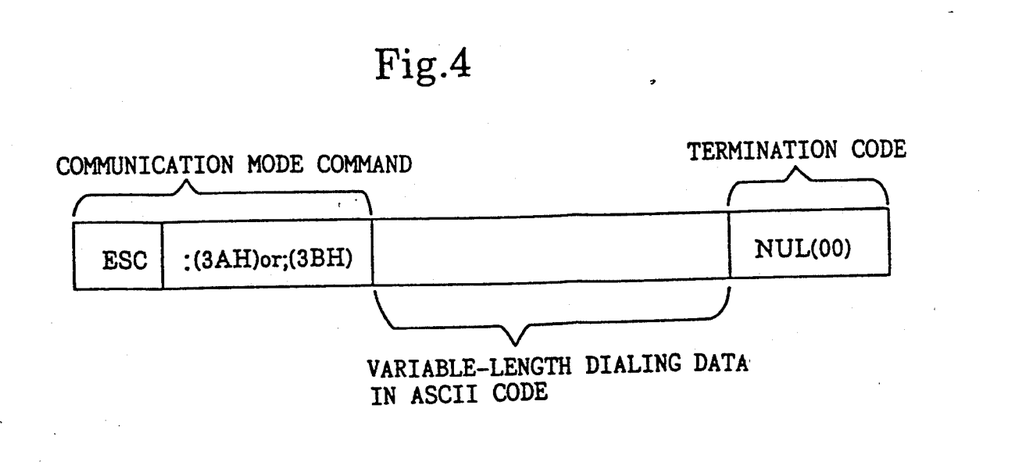
FIG. 4 is a diagram showing the format of dial information sent from the host computer.

The communication mode is set at the time when the communication mode command from the host computer 90 is entered to the controller 20 by way of the interface means 30. The communication mode command is expressed in either ESC+":" (fine mode) or ESC+";" (normal mode) as shown in FIG. 2, and it is followed by a destination telephone number expressed in ASCII code of "0" through "9" before the NUL code is encountered as shown in FIG. 4.

In response to the communication mode command, the controller 20 is connected to the destination facsimile apparatus by way of the modem NCU 80. After that, the image data which has been coded by the host computer 90 in accordance with the image data format shown in FIG. 3 is converted by the controller 20 into the facsimile oriented data, and it is sent to other facsimile apparatus by way of the modem NCU 80.

The entry of FS+NUL+NUL from the host computer 90 indicates the end of transmission for one page. By sending data as shown in FIG. 3 again, the second page is transmitted. The communication mode is terminated by sending another FS+NUL+NUL following the completion of the page.

Next, the procedure of priority control will be explained on the flowcharts of FIGS. 5(a) and 5(b).

Figure 5A:
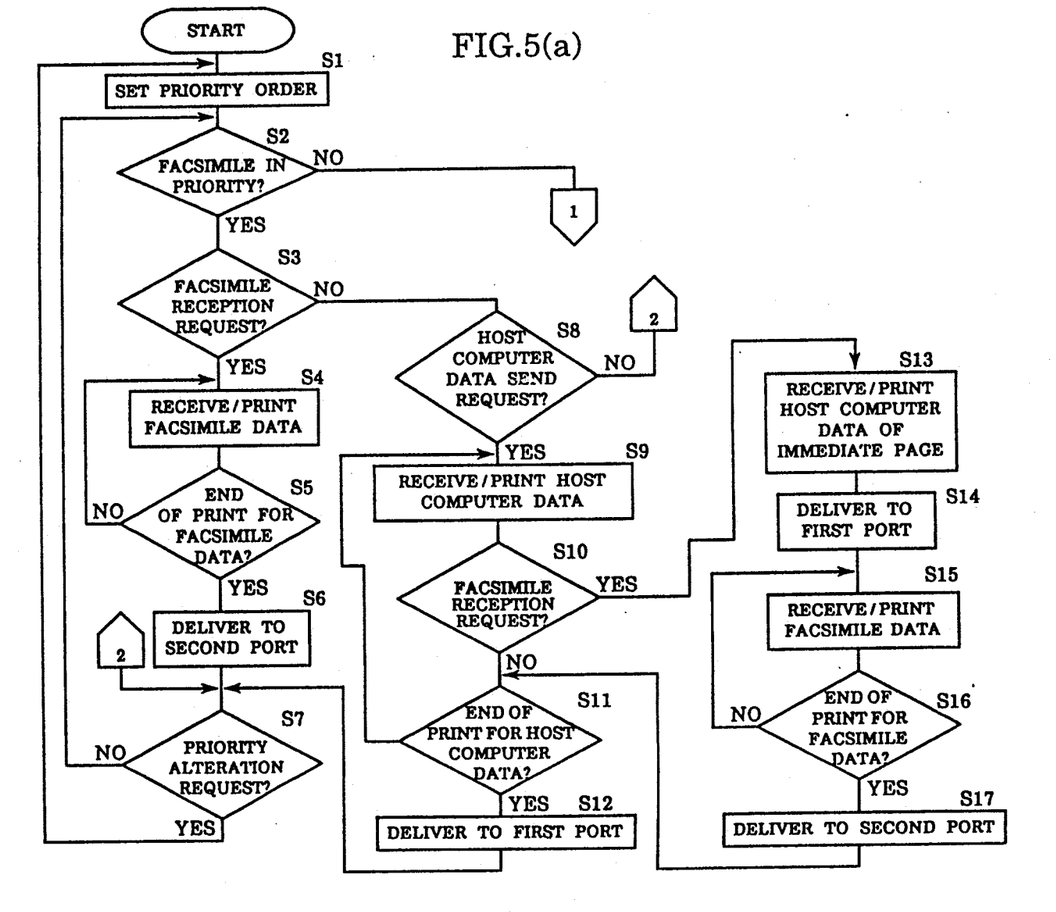
FIGS. 5(a) and 5(b) are flowcharts showing the priority discrimination control for data reception and printing.

In FIG. 5(a), after the apparatus has started operating, the user sets, in step 1 (will be termed simply S1) through the priority order setting means 120, the priority of printing for facsimile data which is entered from the communication line 100 to the modem NCU 80, or printing for data which is entered from the host computer 90 to the interface means 30.

In S2, the priority discriminator 110 detects based on the setting of the priority order setting means 120 as to whether or not the apparatus is in the facsimile priority mode. In response to a result of YES, the controller 20 detects in S3 whether or not there is a facsimile input request. In response to YES, facsimile data over the communication line 100 is received through the modem NCU 80, and it is printed on the printing means 40 (S4). In S5, it is tested whether or not printing of the facsimile data has completed. In response to NO, the control sequence returns to S4, and printing continues until the whole facsimile data is printed.

On completion of printing for the facsimile data (test result of YES in S5), the printed sheet (reception sheet) is delivered to the second sheet delivery port 65 in S6. In S7, it is tested whether or not an alteration of priority order is requested. In response to YES, the control sequence returns to S1 to set a new priority order, or the control sequence returns to S2 in response to NO.

In response to a test result of NO in S3 (absence of facsimile reception request), the control sequence proceeds to S8, in which it is tested whether or not there is a data transmission request from the host computer 90. In response to YES in S8, data from the host computer 90 is received through the interface and printed in S9.

Subsequently, in S10, it is tested whether or not a facsimile reception request has been entered. In response to NO, it is tested in S11 whether or not printing for the data from the host computer 90 is completed. In response to NO in S11, the control sequence returns to S9, and printing for the data from the host computer 90 continues until it is completed. In response to YES in S11, the control sequence proceeds to S12, in which the printed sheet (print sheet) is delivered to the first sheet delivery port 60 under control of the sheet delivery controller 50, and thereafter the control sequence returns to S7.

If, on the other hand, S10 has made a YES judgement (reception of facsimile data during the reception and printing of data from the host computer 90), the control sequence proceeds to S13, in which the current (immediate) page of data from the host computer 90 is continuously received and printed, and the printed sheet (print sheet) is delivered to the first sheet delivery port 60 under control of the sheet delivery controller 50 (S14). After that, in S15, reception and printing of the facsimile data is commenced, and it is received and printed continuously until the end of printing (S16). On completion of printing for the facsimile data, the printed sheet is delivered to the second sheet delivery port 65 under control of the sheet delivery controller 50 in S17. The control sequence returns to S11 to resume printing for the data from the host computer 90.

If S8 has made a NO judgement (absence of both facsimile reception request and host computer data transmission request in the facsimile priority mode), the control sequence returns to S7.

Figure 5B:
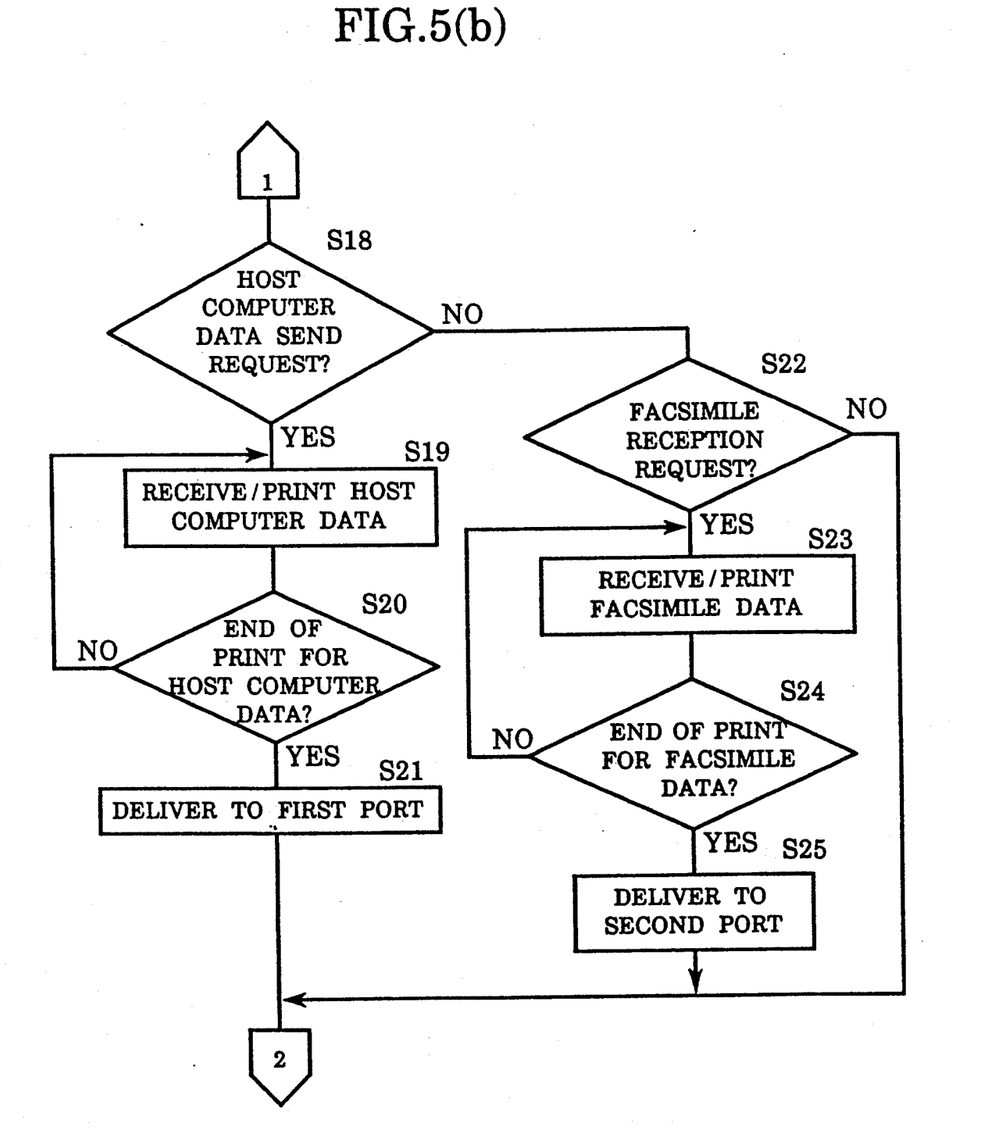

In the case of a NO judgement in S2 (FIG. 5(b)), the control sequence proceeds to S18, in which it is tested whether or not there is a data transmission request from the host computer 90. In response to YES in S18, the host computer data is received and printed in S19. This reception/printing operation continues until the end of printing for the data (S20).

On completion of printing for the host computer data, the control sequence proceeds to S21, in which the printed sheet (print sheet) is delivered to the first sheet delivery port 60, and thereafter the control sequence returns to S7. On the other hand, in response to a NO judgement of S18, the control sequence proceeds to S22, in which it is tested whether or not there is a facsimile reception request. If the test result is YES, the facsimile data is received and printed in S23, and this operation continues until the end of printing is detected in S24. On completion of printing for the facsimile data, the printed sheet (reception sheet) is delivered to the second sheet delivery port 65 in S25 under control of the sheet delivery controller 50, and thereafter the control sequence returns to S7. In the case of a NO judgement in S22 (absence of both host computer data transmission request and facsimile reception request in the host computer priority mode), the control sequence returns to S7 immediately.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A facsimile apparatus having data reception means for receiving first data which is sent from an external unit and second data which is sent from other facsimile apparatus, and printing means for printing the first data and second data received by said data reception means on separate sheets of paper, respectively, wherein said apparatus further comprises:
   mode setting means for setting a first mode in which the first data is received through said data reception means in precedence over the second data, and a second mode in which the second data is received through said data reception means in precedence over the first data;
   mode discrimination means for determining the first or second mode which is set by said mode setting means;
   reception control means for controlling said data reception means based on the first or second mode determined by said mode discrimination means; and
   print control means for controlling said printing means to print the first data or second data received by said data reception means under control of said reception control means.

2. A facsimile apparatus according to claim 1, wherein said printing means comprises a thermal head.

3. A facsimile apparatus according to claim 2, wherein said thermal head includes a number of dots which allows printing of one line, which is along a shorter side of an A4-sized print paper, at once.

4. A facsimile apparatus according to claim 1, wherein said mode setting means comprises a switch which is provided on said facsimile apparatus for setting the first or second mode.

5. A facsimile apparatus according to claim 4, wherein said mode discrimination means determines the first or second mode set by said switch based on a first or second state of switching of said switch.

6. A facsimile apparatus according to claim 1, wherein the printing means prints the first data on first print paper and the second data on second print paper, the apparatus further comprising:

first and second sheet delivery means for delivering the first print paper and second print paper, respectively; and sheet delivery control means for controlling said first and second sheet delivery means so that the first print paper and second print paper are delivered to said first and second sheet delivery means, respectively.

7. A facsimile apparatus according to claim 1 further comprising means for controlling said reception control means and said print control means at a time of setting the second mode so that, in response to an entry of a reception command for the second data during reception and printing of the first data, reception and printing of the first data is suspended, the second data is received and printed, and reception and printing of the first data is resumed upon completion of reception and printing of the second data.

8. A facsimile apparatus comprising:

data reception means for receiving multiple kinds of data;

mode setting means for setting a priority order in which one specific kind of data among said multiple kinds of data is received in precedence over other kinds of data through said data reception means;

mode discrimination means for determining the priority order which is set by said mode setting means; and reception control means for controlling said data reception means in accordance with a priority order determination made by said mode discrimination means.

9. A facsimile apparatus according to claim 8 further comprising printing means for printing a specific kind of data which has been received by said data reception means on a priority basis under control of said reception control means.

10. A facsimile apparatus according to claim 9, wherein said printing means comprises a thermal head.

11. A facsimile apparatus according to claim 10, wherein said thermal head includes a number of dots which allows printing of one line, which is along a shorter side of an A4-sized print paper, at once.

12. A facsimile apparatus according to claim 8, wherein said mode setting means comprises a switch which is provided on said facsimile apparatus.

13. A facsimile apparatus according to claim 12, wherein said mode discrimination means determines the priority order set by said switch based on a state of switching of said switch.

14. A facsimile apparatus comprising:

data reception means for receiving multiple kinds of data;

printing means for printing said multiple kinds of data on sheets of print paper, each kind of data being printed on a corresponding sheet of print paper;

data transmission means for transmitting said multiple kinds of data, which have been received by said data reception means, to said printing means sequentially;

print control means for operating on said printing means to print data which has been transmitted by said data transmission means;

multiple sheet delivery means for delivering a plurality of sheets of print paper, which have been printed by said printing means, in correspondence to the multiple kinds of data; and sheet delivery control means for controlling said sheet delivery means so that the plurality of sheets of print paper are delivered to said multiple sheet delivery means separately in correspondence to the kinds of printed data.

15. A facsimile apparatus according to claim 14, wherein said data transmission means transmits multiple kinds of data to said printing means in accordance with a predetermined order, and said print control means operates on said printing means to print data, which have been sent from said data transmission means, on sheets of print paper in accordance with the predetermined order.

16. A facsimile apparatus according to claim 14, wherein said printing means comprises a thermal head.

17. A facsimile apparatus according to claim 16, wherein said thermal head includes a number of dots which allows printing of one line, which is along a shorter side of an A4-sized print paper at once.

18. A facsimile apparatus comprising:

data reception means for receiving multiple kinds of data;

priority order setting means for setting a priority order of reception for the multiple kinds of data implemented by said data reception means;

priority discrimination means for determining the priority order which is set by said priority order setting means; and reception control means for controlling said data reception means in accordance with a determination made by said priority discrimination means.

19. The facsimile apparatus of claim 18, wherein the multiple kinds of data include first priority data and second priority data, and the priority order setting means prioritizes the first priority data over the second priority data.

20. The facsimile apparatus of claim 19, further comprising means for controlling said reception control means at a time of setting the priority order so that, in response to entry of a reception command for reception of the first priority data during reception of the second priority data, reception of the second priority data is suspended, the first priority data is received, and reception of the second priority data is resumed upon completion of reception of the first priority data.

21. The facsimile apparatus of claim 18, further comprising:

printing means for printing the multiple types of data on print sheets; and sheet delivery control means for controlling the printing means to deliver the print sheets of one type of data separately from the print sheets of another type of data.

22. The facsimile apparatus of claim 21, wherein the sheet delivery control means operates to deliver the print sheets in accordance with the priority order set by the priority order setting means.

23. The facsimile apparatus of claim 8, wherein the multiple kinds of data include first priority data and second priority data, and the mode setting means establishes a priority order to prioritize the first priority data over the second priority date.

24. The facsimile apparatus of claim 23, further comprising means for controlling said reception control means at a time of setting the priority order so that, in response to entry of a reception command for reception of the first priority data during reception of the second priority data, the reception of second priority data is suspended, the first priority data is received, and reception of the second priority data is resumed upon completion of reception of the first priority data.

25. The facsimile apparatus of claim 15, wherein the multiple kinds of data include first priority data and second priority data, and the data transmission means establishes a priority order to prioritize the first priority data over the second priority data.

26. The facsimile apparatus of claim 25, further comprising means for controlling said sheet delivery control means at a time of setting the predetermined order so that, in response to entry of a reception command for reception of the first priority data during reception of the second priority data, a reception of the second priority data is suspended, the first priority data is received, and reception of the second priority data is resumed upon completion of reception of the first priority data.

* * * * *